Figure 6:
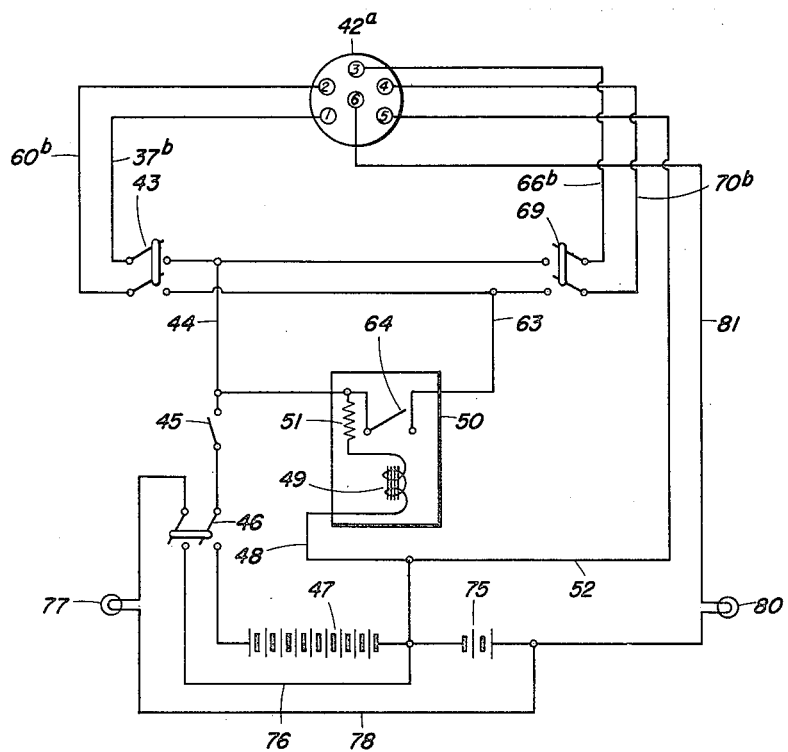

March 8, 1955
C. C. LAURITSEN
2,703,508
ROCKET PROJECTOR
Filed April 2, 1943
4 Sheets-Sheet 1
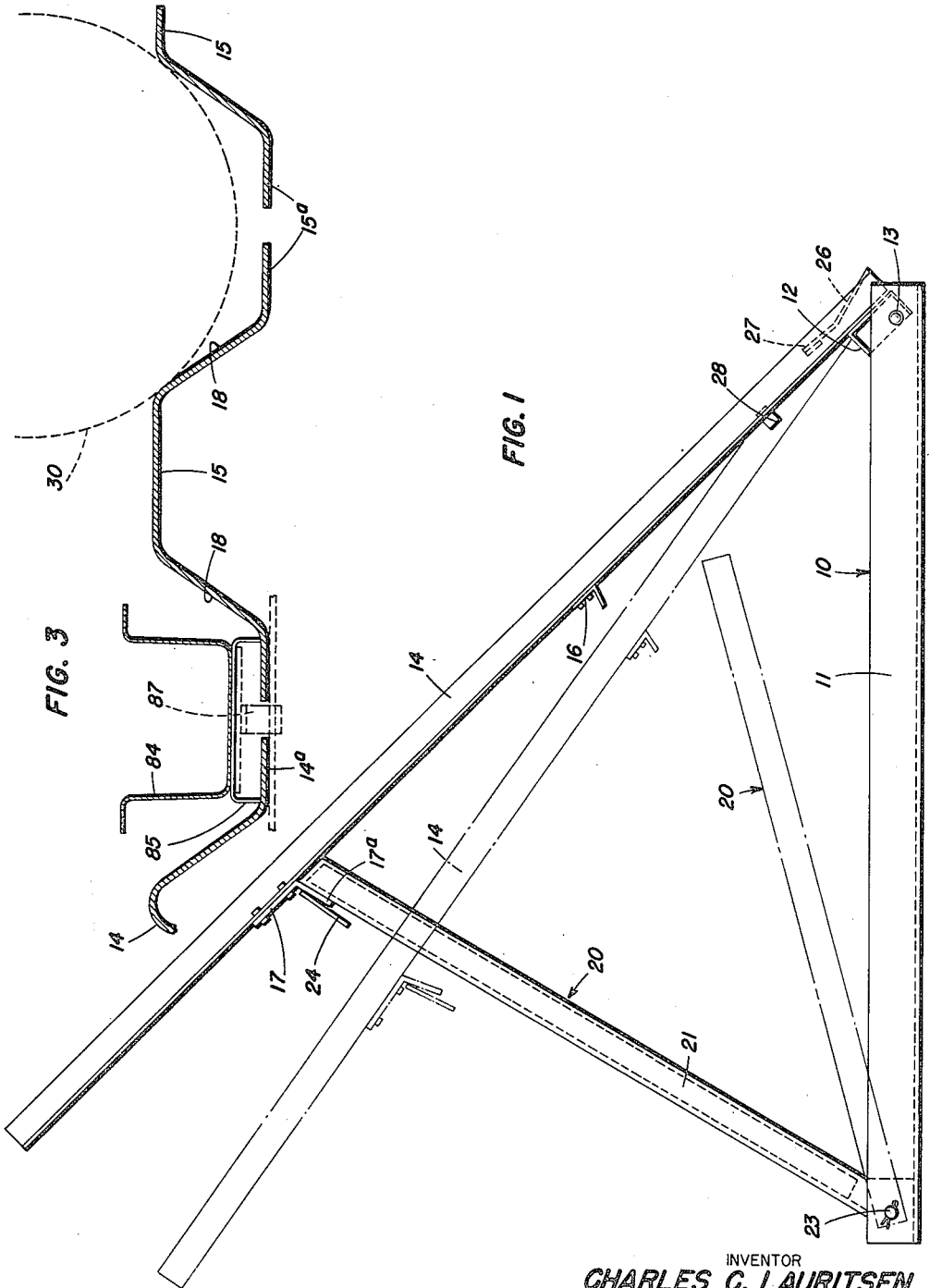
INVENTOR
CHARLES C. LAURITSEN
BY
ATTORNEY

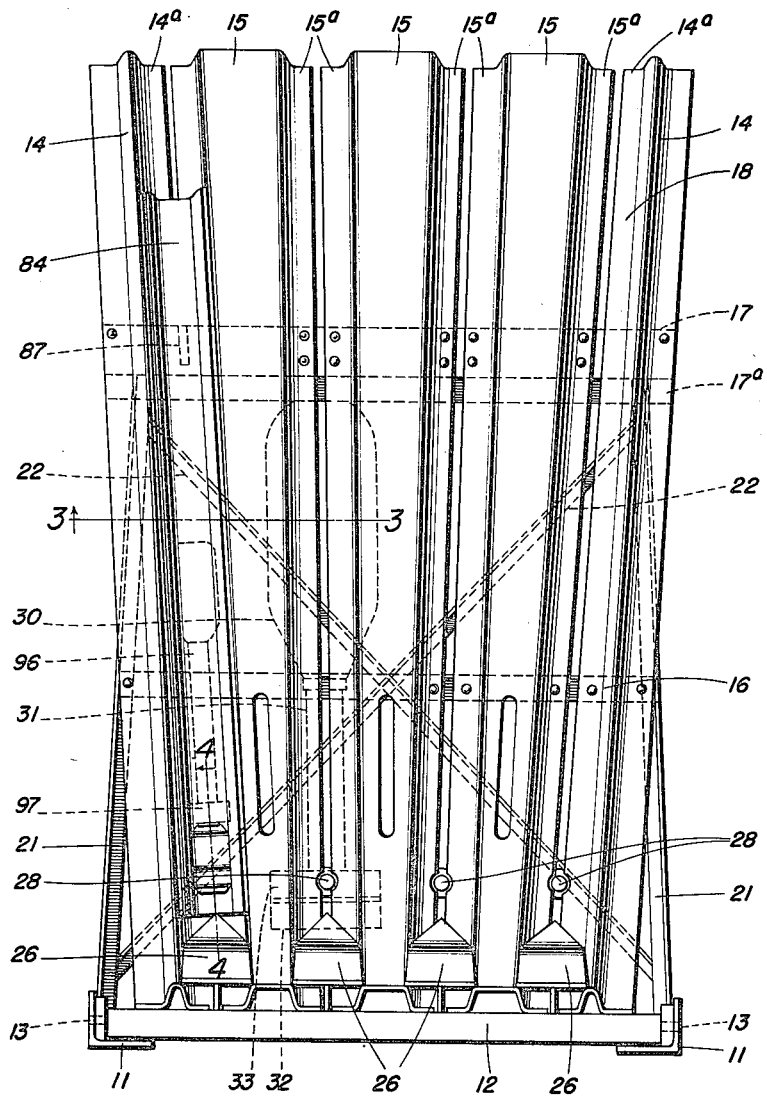

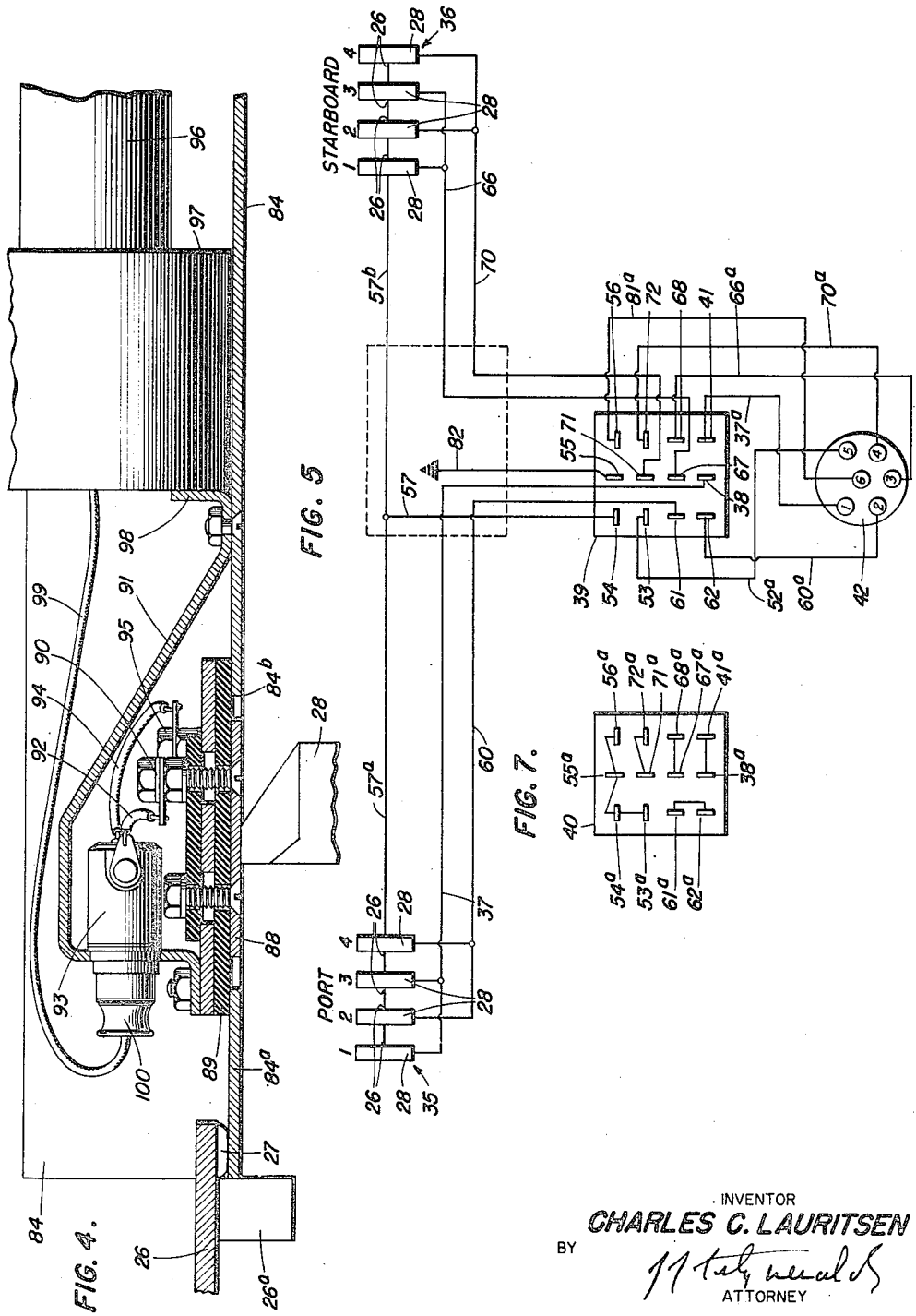

March 8, 1955 C. C. LAURITSEN 2,703,508
ROCKET PROJECTOR

Filed April 2, 1943 4 Sheets-Sheet 4

INVENTOR
CHARLES C. LAURITSEN
BY
ATTORNEY

United States Patent Office 2,703,508
Patented Mar. 8, 1955

2,703,508

ROCKET PROJECTOR

Charles C. Lauritsen, Pasadena, Calif., assignor to the United States of America as represented by the Secretary of the Navy Application April 2, 1943, Serial No. 481,650

2 Claims. (Cl. 89—1.7)

This invention relates to projectors for rocket-propelled devices and more particularly to a novel projector having means for energizing an electrical igniter in the rocket and which may be made in a form suitable for projecting salvos of rocket-propelled devices of different sizes.

While the new projector may be used with various types of rocket-propelled devices, it may be employed to particular advantage for projecting rocket-driven bombs from mobile craft, such as boats and land vehicles. Accordingly, for illustrative purposes, the invention will be described and illustrated in a form adapted for use on the deck of a patrol boat, or the like, for projecting anti-submarine bombs, although it will be understood that the invention may take other forms as well.

It has been proposed to attack submerged submarines from surface craft by employing a rocket motor for propelling a bomb through an air trajectory to a point in the water above the estimated position of the submarine, a rocket motor suitable for this purpose being disclosed in a copending application of C. C. Lauritsen, Ser. No. 481,645, filed April 2, 1943, now Patent 2,469,350. One of the principal advantages of projecting bombs in this manner is the absence of recoil on the attacking craft, whereby the rocket projectors may be mounted on small craft which are not sufficiently rugged to withstand the recoil of guns of comparable fire power. In the use of such bombs, it is desirable to fire them in salvos to obtain a predetermined pattern calculated to cover a certain area in which the submarine is located.

One object of the present invention, therefore, resides in the provision of a novel rocket projector for use in firing rocket-propelled devices in salvos.

Another object of the invention is to provide a rocket projector of novel construction which may assume a collapsed position when it is not in use, so that it occupies a relatively small space, and which is readily movable to its operating position.

A further object of the invention is to provide a rocket projector including an electrical ignition system for use in energizing igniters in the rocket motors on the projector.

Still another object of the invention resides in the provision of a rocket projector having a support for a relatively large rocket and bomb assembly, and an adaptor which may be mounted on the support for use in projecting a smaller rocket and bomb assembly.

These and other objects of the invention may be better understood by reference to the accompanying drawings illustrating one form of the new projector. In the drawings Fig. 1 is a side view of part of the projector, showing the guide unit for supporting the rockets;

Fig. 2 is a rear view of the device illustrated in Fig. 1, showing an adaptor on the guide unit for receiving a smaller rocket;

Figs. 3 and 4 are sectional views on the lines 3—3 and 4—4, respectively, in Fig. 2;

Figs. 5 and 6 are schematic views showing the ignition system for the rockets, and Fig. 7 is a diagrammatic view of a safety plug for use in the ignition system.

Referring to the drawings, the projector there shown comprises a base frame 10 including a pair of longitudinal members 11, which may be made of angular iron, forming the sides of the frame. The base frame is adapted to be bolted or otherwise secured to an operating platform, such as the deck of a boat. A cross-piece 12 extends between the sides of the frame near the rear end thereof and is mounted for rotation in the frame on pivots 13. A plurality of inverted trough-shaped members 14 and 15 extend longitudinally of the frame and are connected at their rear ends to the cross-piece 12. The trough-shaped members 14 and 15, as shown, have outwardly extending flanges 14a and 15a, respectively, along their side edges, the flanges of adjacent members being disposed in closely spaced relation. Intermediate their ends, the members 14 and 15 are connected by transverse bars 16 and 17 secured to the lower faces of the members. The upper faces of the members 14 and 15 define a plurality of generally trough-shaped guides 18 extending lengthwise of the frame, on which they are hinged as a unit. Any desired number of guides 18 may be provided, but for illustrative purposes I have shown four guides. Preferably, the members 14 and 15 are arranged so that the guides diverge slightly from the cross-piece 12. It will be understood that the guides 18 may be formed by means other than the trough-shaped members 14 and 15, as, for example, by a series of longitudinal bars or rods connected to the cross-piece 12.

The guide members 14—15 are normally locked in an operating position in which they are inclined with respect to the frame 10 at an angle of substantially 45 degrees. For this purpose, I provide a crotch 20 comprising a pair of longitudinal beams 21 forming the sides of the crotch, the beams being braced by diagonal members 22. One end of the crotch 20 is connected to the front end of frame 10 by pivots 23, and the opposite end of the crotch normally engages a flange 17a on the cross bar 17 so as to hold the guide members in their operating positions. The crotch may be secured to the flange 17a by a suitable lock having a handle 24. When the projector is not in use, the handle 24 is moved to release the crotch from flange 17a, and the guide members 14—15 are raised slightly to allow the crotch to swing downwardly on its pivots 23 and against the frame 10. The guide members 14 may then be swung downwardly as a unit on pivots 13 so that the entire assembly lies flat on the operating platform and occupies a relatively small space.

A contact plate 26 is mounted on the guide assembly at the rear end of each guide 18, each plate being spaced slightly above the bottom of the guide and centered therein. The front end of each plate is tapered and carries on its lower face a knife blade contact 27 extending generally parallel to the bottom of the guide. The rear end portions of the plates 26 diverge upwardly from the bottoms of the guides, as shown in Fig. 1, for a purpose to be described presently. Mounted in front of the contacts 27 are contacts 28 extending through the bottoms of the guides in the spaces between adjacent flanges 14a—15a, the contacts 28 being insulated from the guide assembly by suitable insulating means (not shown).

The projector is adapted for use with a rocket propelled assembly including a rocket motor similar to that disclosed in the above identified application of C. C. Lauritsen, Serial No. 481,645, now Patent 2,469,350. More particularly, the rocket assembly includes an anti-submarine bomb 30 connected at its rear end to the rocket motor 31. The rocket motor contains a propellant charge (not shown) which is ignitable electrically through a circuit including a pair of tail rings 32 and 33 on the motor, the tail ring 33 being insulated from the motor body. In operation, a rocket assembly 30—31 is placed in each of the guides 18, the sides of which engage the bomb 30 so as to prevent lateral movement of the assembly. Each assembly is moved rearwardly in the guide until the bottom of tail ring 32 slides under the front end of plate 26 against a stop 26a, whereby the contacts 27 and 28 firmly engage the inner surface of ring 32 and the outer surface of ring 33, respectively. Thus, when the contacts 27 and 28 are connected across a current source, the propellant charge in rocket motor 31 is ignited electrically through a circuit traceable from one side of the current source through plate 26, contact 27, ring 32, the igniter (not shown), ring 33, and contact 28 back to the other side of the current source. The rocket motor then propels the assembly 30—31 along the guide 18 so that the rings 32 and 33 slide out of engagement with contacts 27 and 28. The guide 18 serves to direct the flight of the rocket assembly while it is being accelerated by motor 31, whereby the trajectory may be accurately controlled. By arranging the guides 18 in diverging relation, a salvo of rocket assemblies fired from the projector is provided with the desired dispersion. The inclined rear end portions of the contact plates 26 serve to deflect the blasts from the rockets and prevent damage to the operating platform.

For some purposes, it may be desired to employ two projectors, one on each side of the attacking craft, as shown schematically at 35 and 36 in Fig. 5, the guides of each projector, for convenience, being numbered consecutively from left to right. In order to provide a close operating control over the rocket motors in the two sets of guides 35 and 36, the projector includes an ignition system illustrated diagrammatically in Figs. 5 and 6. As there shown, the insulated contacts 28 of the odd numbered guides in projector 35 are connected by wire 37 to a contact 38 in a safety box 39 having a safety plug 40 which, when inserted in the box, connects contact 38 through a conductor 38a—41a to a contact 41 in the box. The contact 41 is connected through a wire 37a, a releasable connector 42—42a, wire 37b, a normally open double-pole switch 43, wire 44, a normally open firing switch 45, and a normally open double pole switch 46 to the positive side of a battery 47. The negative side of the battery is connected through wire 48 to a relay winding 49 forming part of a time delay device 50, the winding being connected through a resistor 51 to the wire 44. A branch conducting path 52 leads from wire 48 through connector 42—42a and wire 52a to a contact 53 in safety box 39. The plug 40 is adapted to connect contact 53 through conductors 53a—54a—55a—56a to contacts 54, 55, and 56 in the safety box 39. The contact 54 is connected through wires 57 and 57a to the grounded contacts 26 on projector 35.

The insulated contacts 28 in the even numbered guides of projector 35 are connected through wire 60 to a contact 61 in the safety box 39. The plug 40 is adapted to connect contact 61 through a conductor 61a—62a to a contact 62 which is connected through wire 60a, connector 42—42a, wire 60b, the other pole of switch 43, and a wire 63 to one side of a normally open switch 64 adapted to be closed by energizing of the relay 49. The other side of switch 64 is connected through wire 44 and switches 45 and 46 to the positive side of battery 47.

The insulated contacts 28 in the odd numbered guides of the other projector 36 are connected through wire 66 to a contact 67 in the safety box, and the contact 67 may be connected through a conductor 67a—68a in the plug 40 to a contact 68 in the box. The contact 68 is connected through wire 66a, connector 42—42a, wire 66b, a normally open double-pole switch 69, wire 44 and switches 45 and 46 to the positive side of the battery. Similarly, the insulated contacts 28 in the even numbered guides of projector 36 are connected by wire 70 to a contact 71 in the safety box, which may be connected through a conductor 71a—72a in the plug to a contact 72 in the box. The contact 72 is connected through wire 70a, connector 42—42a, wire 70b, the other pole of switch 69, and switches 64, 45 and 46 to the positive side of the battery. The grounded contacts 26 in projector 36 are connected through wires 57b, 57, 52a and 52 to the negative side of the battery.

A battery 75 is connected at its negative side to the grounded wire 52 and through a wire 76, the other pole of switch 46, an indicator lamp 77, and a wire 78 to the positive side of battery 75. A second indicator light 80 is connected to the positive side of battery 75 and through a conductor 81, connector 42—42a and wire 81a to the contact 56, which is adapted to be connected through plug 40 to a grounded wire 82 and to contact 53.

The operation of the ignition system is as follows: To prepare the projectors for operation, the safety plug 40 is inserted in box 39, the lamp 80 being thus energized from battery 75 through wires 52 and 52a, contacts 53 and 56, and wires 81a and 81 to indicate that the system is ready to operate. When it is desired to fire the rockets in the port projector 35, the switches 43 and 46 are closed, whereby an indicator circuit is established through lamp 77 to show that the firing battery is in circuit. The firing switch 45 is then closed so that the insulated contacts 28 in the odd numbered guides of projector 35 are connected through wires 37, 37a and 37b, switches 43, 45 and 46, battery 47, and conductors 52, 52a, 57 and 57a to the grounded contacts 26. At the same time, a branch circuit is established across battery 47 through resistor 51, relay 49 and wire 48. As a result, the rockets in the odd numbered guides of projector 35 are fired, and when switch 64 is closed by relay 49, the rockets in the even numbered guides of projector 35 are energized and fired through the circuit including wires 60, 60a and 60b, switches 43, 64, 45 and 46, battery 47 and the common return path 52. By the use of the time delay device 50, simultaneous firing of adjacent rockets in the projector is prevented. This is a desirable feature because if adjacent rockets were fired simultaneously, the blast from one of the rockets might interfere with the flight of the other. The time delay afforded by relay 49 is preferably small so that the rockets are fired in a salvo with sufficient spacing between adjacent rockets to provide uninterrupted flight.

Firing of the rockets in the other projector 36 may be effected by closing switches 69 and 46 and actuating the firing switch 45. The operation of the energizing circuits for the projector 36 is similar to the operation of the circuits described in connection with projector 35 and need not be described in detail. If desired, a single salvo may be fired from the two projectors 35 and 36 by closing switches 43 and 69 simultaneously. When a single salvo is fired, the time delay device 50 causes energizing of the rockets in the even numbered guides of both projectors shortly after the rockets in the odd numbered guides are energized.

In order to train personnel in the use of the new projector, it may be desired to employ a smaller rocket and bomb assembly, that is, an assembly employing a subcaliber bomb and a motor of smaller capacity. For this purpose, I provide an adaptor guide 84 which may be mounted in each of the main guides 18. The adaptor guide, as shown, is generally trough-shaped and is considerably narrower and shorter than the main guides. A bracket 85 is connected to the bottom of each adaptor 84, intermediate its ends and has legs which rest upon the bottom of the guide 18 to support the adaptor. In mounting the adaptor, it is placed in the guide 18 and moved rearwardly until the bottom of the adaptor slides under contact 27 against the stop 26a. Preferably, the adaptor is provided near its front end with a finger 87 which fits in the space between adjacent flanges 14a—15a and hooks over the cross bar 17. Thus, the adaptor is held down on guide 18 by contact plate 26 and the finger 87.

Near its rear end, the bottom of each adaptor 84 is provided with an elongated opening 84b which receives a contact 88 mounted on an insulating strip 89 in the adaptor. An insulated terminal 90 in the adaptor is electrically connected to contact 88 and is disposed in a housing 91 on the adaptor. The terminal 90 is connected through a wire 92 to one side of an electric socket 93 in the housing, the other side of the socket being connected through a wire 94 to a terminal 95 grounded to the adaptor and the contact 27. Thus, when the adaptor is mounted in position on guide 18, the insulated contact 88 engages the insulated contact 28 in the guide, whereby socket 93 is connected across the contacts 27 and 28.

In operation, the sub-caliber rocket assembly 96 is placed in the adaptor guide 84 near the rear end thereof. The assembly 96 is generally similar to the assembly 30—31, except that it has a single tail ring 97 and the propellant charge is ignited electrically through wiring 99 connected to a plug 100 which may be inserted in the socket 93. When the adaptors are assembled on the guides 18, the sub-caliber rocket assemblies 96 may be fired electrically through the ignition system, which is operated in the manner previously described. The adaptors 84 may be easily removed from the guides 18, and the projector is then ready for use with the larger rocket assemblies 30—31.

I claim:

1. A projector for electrically ignitible rockets, which comprises two sets of adjacent guides for supporting the rockets, contact means for each guide engageable with a rocket in the guide, a current source, switch means for selectively connecting the contact means of said sets to the current source, whereby each set of contact means may be connected to the current source to the exclusion of the other set, and a time delay device for delaying the connection to the current source of one contact means of each set until after the adjacent contact means has been connected to said source.

2. A projector for electrically ignitible rockets, which comprises two sets of adjacent guides for supporting the rockets, contact means for each guide engageable with a rocket in the guide, one of said contact means on each guide having an inclined rear end portion diverging rearwardly and upwardly relative to the guide and in alignment with a loaded rocket to thereby deflect the blast of a rocket being launched, a current source, switch means for selectively connecting the contact means of said sets to the current source, whereby each set of contact means may be connected to the current source to the exclusion of the other set, and a time delay device for delaying the connection to the current source of one contact means of each set until after the adjacent contact means has been connected to said source.

References Cited in the file of this patent

UNITED STATES PATENTS

| Number | Name | Date |
|---|---|---|
| 215,895 | Douty | May 27, 1879 |
| 455,279 | Cunningham | June 30, 1891 |
| 499,790 | Meadowcroft | June 20, 1893 |
| 741,079 | Tasker | Oct. 13, 1903 |
| 785,644 | Unge | Mar. 21, 1905 |
| 969,011 | Vedder | Aug. 30, 1910 |
| 1,092,763 | Bourdelles | Apr. 7, 1914 |
| 1,280,579 | Stone et al. | Oct. 1, 1918 |
| 1,294,240 | Cooke | Feb. 11, 1919 |
| 1,438,833 | Kaminski | Dec. 12, 1922 |
| 1,446,000 | Davis | Feb. 20, 1923 |
| 1,449,449 | Sayres | Mar. 27, 1923 |
| 2,029,778 | Krammer | Feb. 4, 1936 |
| 2,044,666 | Burney | June 16, 1936 |
| 2,208,015 | Caulkins | July 16, 1940 |
| 2,325,560 | Wauters | July 27, 1943 |
| 2,342,684 | Nelson | Feb. 29, 1944 |
| 2,347,308 | Woldring | Apr. 25, 1944 |
| 2,389,162 | McInnes | Nov. 20, 1945 |
| 2,469,350 | Lauritsen | May 10, 1949 |
| 2,479,590 | Pollock | Aug. 23, 1949 |

FOREIGN PATENTS

| Number | Country | Date |
|---|---|---|
| 25,326 | Great Britain | of 1894 |
| 775,986 | France | Oct. 22, 1934 |
| 832,464 | France | July 4, 1938 |
| 525,065 | Great Britain | Aug. 21, 1940 |
| 864,212 | France | Jan. 13, 1941 |